(12) United States Patent
Albrecht et al.

(10) Patent No.: US 6,316,898 B1
(45) Date of Patent: Nov. 13, 2001

(54) PULSE MODULATED CAPACITIVE RETRACT DEVICE FOR A VOICE COIL ACTUATOR

(75) Inventors: Thomas Robert Albrecht, San Jose; Erno Hilbrand Klaassen, Santa Clara, both of CA (US)

(73) Assignee: International Business Machines Corporation, NY (US)

( * ) Notice: Subject to any disclaimer, the term of this patent is extended or adjusted under 35 U.S.C. 154(b) by 0 days.

(21) Appl. No.: 09/430,517

(22) Filed: Oct. 29, 1999

(51) Int. Cl.[7] .............................. G11B 5/54; G09B 9/02; G05B 9/02
(52) U.S. Cl. .................... 318/560; 318/561; 318/563; 318/368; 360/75; 360/78.04; 360/105
(58) Field of Search .................... 318/560–696, 318/369–380; 360/78.04, 75, 32, 105, 107, 78.13, 78.06, 73.03, 78.01, 78.12

(56) References Cited

U.S. PATENT DOCUMENTS

| | | | |
|---|---|---|---|
| 4,786,995 | | 11/1988 | Stupeck et al. ................ 360/75 |
| 4,967,291 | * | 10/1990 | Touchton et al. ............. 360/78.04 |
| 5,325,030 | * | 6/1994 | Yamamura et al. ............ 318/563 |
| 5,384,524 | * | 1/1995 | Romano ...................... 318/569 |
| 5,455,496 | * | 10/1995 | Williams et al. ............. 318/563 |
| 5,486,957 | * | 1/1996 | Albrecht ....................... 360/75 |
| 5,495,156 | | 2/1996 | Wilson et al. ................. 318/368 |
| 5,504,402 | * | 4/1996 | Menegoli ...................... 318/377 |
| 5,615,064 | | 3/1997 | Blank et al. .................. 360/75 |
| 5,663,846 | * | 9/1997 | Masuoka et al. .............. 360/75 |
| 5,737,144 | * | 4/1998 | Ataee et al. .................. 360/75 |
| 6,025,968 | * | 2/2000 | Alberoht ....................... 360/75 |

\* cited by examiner

Primary Examiner—Paul Ip

(57) ABSTRACT

A capacitor powered electronic emergency device retracts and parks an actuator into a resistive parking position with a crash stop barrier. Due to variations of the kinetic status of the actuator at the begin of the retraction, the actuator reaches the resistive parking position with different velocities, which can be at a level that causes the actuator to bounce off the crash stop barrier. A modulating pulsing of the energy flow extends the discharge time of the capacitor long enough to provide sufficient energy to compensate an eventual bounce-off. The use of transistors in the device keeps the internal energy consumption low. An increase of the pulsing frequency in dependence on the capacitor voltage results in a high average current flow.

19 Claims, 9 Drawing Sheets

PULSE MODULATED CAPACITIVE RETRACT DEVICE FOR A VOICE COIL ACTUATOR

FIELD OF INVENTION

The present invention relates to the field of power-off actuator retract devices in hard disk drives.

BACKGROUND OF THE INVENTION

Hard disk drives are the most commonly employed data storage devices in personal computers, which are being continuously improved to meet the demand for higher performance. The amount of data to be stored on a hard disk drive is rapidly increasing due to more sophisticated software applications and larger data files. At the same time, personal computers are becoming smaller in size. For example, new types of portable computers known as notebooks and miniaturized desktop computers have been introduced to meet the demands for less space consumption in an office environment.

The reasons described above together with an additional demand for faster access to the data stored on the hard disk drive are forcing the manufacturers to reduce the size of hard disk drives.

A typical hard disk drive includes the following: a number of spinning disks stacked above each other on a spindle, a disk controller, a rotary actuator and an actuator retract circuit. All these elements are mounted in a chassis or housing and supplied with external cable connectors.

The spinning disks have a magnetic recording layer for data storage. The rotary actuator consists of a number of arms equipped with heads for reading and writing data in generally radial and concentric tracks in the recording layers of the individual disks. The actuator is usually driven by an attached voice coil motor(VCM). Flexible cables are connected with the actuator and the controller to transmit signals to and from the heads and to power the VCM. The disk controller is typically an electronic circuit that controls all functions of the hard disk drive.

During regular operation of the drive, the controllers control the actuator motions including the movements to and from a parking position, at which the actuator is placed when the drive is not under operation. However, if the power supply to the drive is shut off unexpectedly, the actuator may not be in the proper parking position. Since the controller requires external power to operate, it cannot park the actuator after unexpected power supply shut-off. An independent retract circuit parks the actuator in such cases.

Such a retract circuit has to be able to power and control the retraction or withdrawal of the actuator from the disk surface into a parking position within a critical time period during which the spinning disks slow down to a minimal rotational speed. The minimal rotational speed guarantees sufficient supporting airflow between the disk surface and an air bearing surface of the read and write heads to keep them at a minimum flying height. In case the supporting airflow should fall beneath a critical value, the heads are likely to crash and damage the disk surface. Moreover, if the heads were to come to rest on the smooth disk surface, they would adhere to the disks through a process known as stiction.

There are two main methods for parking heads during power-off of the disk drive. The first is known as contact start-stop (CSS). In this method, the heads are moved to a special central location of the disks, the so-called landing zone. During the down spinning period of the disks, the supporting airflow decays and the heads land on the landing zone. To prevent stiction between the heads and disks, this landing zone is roughened or textured.

One of the main shortcomings of CSS is wear between the heads and the disks, which is caused by a sliding contact during the landing process. Another problem is that the flying height of heads in modern disk drives is becoming lower than the minimum required surface roughness, such that the heads tend to contact the textured disk surface, while the disks are still rotating at full speed. As a result, the interface is subject to excessive wear.

External imposed mechanical shock causes the heads, parked on the central landing zone to vibrate with the danger of vertically impacting the disk surfaces, an effect commonly known as head slap. Head slap can damage the heads and disks, and can generate particles that could cause the heads to crash.

Another method for parking heads during power-off is to move them to a parking ramp, located at either the inner or outer diameter of the disks. Each head of an actuator is mounted on a suspension. A tab or sliding element is provided at the end of the suspension. The tab is pushed onto the wedge shaped ramp. When the tabs reach the predetermined parking position on the ramp, the actuator is held in place with either a mechanical or an inertial latch. A mechanical latch locks the actuator in place, while an inertial latch engages a mechanism against the actuator when the drive is exposed to mechanical shock or acceleration. This ramp-parking process overcomes some of the shortcomings of CSS parking described above. Since the heads are not sitting on the disk during power-off, they are less prone to damage from external shocks. This is especially important in portable disk drives.

The electrical energy necessary for the retract movement to a parking position and the internal energy consumed by the actuator retract circuit is typically generated by a back electromotive energy generated from the kinetic energy stored in the rotating disk stack. The kinetic energy is thereby converted into a back electromotive voltage (BEMV) by utilizing the disk motor as a generator. The rectified BEMV is electrically connected across the voice coil motor VCM, which generates a torque on the actuator in the desired direction into the parking position. An example of such a retract circuit is described in U.S. Pat. No. 5,486,957.

As disk drives are made increasingly smaller for portable applications, several design parameters become limiting to the use of spindle motor BEMV for the retract event. The primary demand to save battery power reduces the size and mass of all moving or accelerated parts with the following results: First, the disk drives employ fewer disks of smaller diameter and the disk motors have lower torque constants and a relatively high internal resistance. These parameters reduce the magnitude of the back electromotive voltage that can be obtained from the spinning motor, as well as the total energy that can be extracted to park the actuator. Secondly, the VCM also has a low torque constant and an increased internal resistance due to a reduced wire diameter of the windings. Since the bias force from the actuator cables is not reduced proportionally with the torque constant of the VCM, the minimal required retract energy is higher relative to that in conventional disk drives.

Some parameters become more advantageous, such as the lower moment of inertia of the shorter actuator, and a reduced number of heads with their tabs that have to be moved onto a parking ramp.

Still, the combination of all parameters impose an increase of the demanded retract energy relative to the electric energy that can be extracted from the kinetic energy of the down spinning disk stack.

To overcome these problems in small drives, an alternate approach is to power the retract circuit with energy stored in a capacitor. A combination of both types of energy sources may also be used.

U.S. Pat. No. 4,786,995 to Stupek teaches a retract system for use with a stepper-motor actuator. Energy for the stepper motor is derived from the back electromotive energy generated from the down-spinning disk stack assisted by a charged capacitor. Highly complicated electronics are used to supply the energy in a number of pulses with a predetermined rate that defines the velocity and the rotational angle of the stepper motor. The stepper motor imposes its controlled rotation over a geared transmission system onto the actuator. The retract system is sophisticated and relies heavily on resistive components, which increase internal energy consumption. Even in hard disk drives equipped with large diameter disks and a relatively large amount of available kinetic energy additional capacitors have to be used to power the electronics and the stepper motor for the retraction and parking. The retract system is not feasible for small hard disk drives that use voice coils.

U.S. Pat. No. 5,325,030 to Yamamura et al. describes the general use of capacitors as possible energy source for a voice coil actuator retract. To initiate the retraction the capacitor is simply connected to the voice coil actuator to provide a single energy pulse. The actuator is accelerated and moves away from the disk surface. A shortcoming of single-pulse type capacitor retract systems is that the actuator may not properly enter and stay in the parking position under all circumstances. At the moment of power-off, the velocity and position of the actuator can vary over the operational range of positions and velocities during the regular usage of the drive. The torque needed to reach the parking position varies widely depending on these initial conditions. With a single pulse retract, without any adjustment for initial conditions, a predetermined torque pulse is applied to the actuator regardless of initial conditions. In some situations the torque pulse may be too large, such that the actuator bounces out of the parking position, which results in drive failure.

U.S. Pat. No. 5,495,156 to Wilson et al. discloses an actuator retraction circuit that uses the back electromotive energy generated from a down spinning disk stack to move the actuator into a parking position. The velocity of the actuator in or against retraction direction at the beginning of the retraction event generates an electromotive voltage, which is utilized to adjust the amount of energy imposed in an initial energy pulse onto an actuator motor. The invention sufficiently compensates the velocity differences of the actuator at the beginning of the retraction event to park the actuator with a predetermined end velocity. Because of the sophistication of the circuit with its reliance on resistors its internal energy consumption is too high to utilize it in very small disk drives. The disclosed invention is also only designed to impose most of its energy in an initial impulse leaving no energy reserves for the moment when the actuator reaches the ramp to ensure the proper retention in the predetermined parking position.

U.S. Pat. No. 5,615,064 to Blank et al. and U.S. Pat. No. 5,663,846 to Masuoka and Toru describe actuator control systems that use a back electromotive voltage from the actuator motor as a control signal during regular operation of the hard disk drive. The hard disk drive has an external energy supply. The control signal is processed together with other derived parameters within the hard disk controller for a regular operational retraction. The back electromotive voltage is changed into a control signal with a relative high energetic expenditure. The disclosed inventions are thus not useful for a power-off retract circuit with a very limited energy supply derived from capacitors.

A further shortcoming of capacitive retract systems is that they require physically large and expensive capacitors to store energy to power the retract. In a very small drive, such as a 1-inch drive in a CompactFlash form factor, it is challenging to budget enough space for a large capacitor. Since single-pulse capacitive retract circuits are inefficient in their conversion of stored energy into mechanical energy of the rotary actuator, the capacitors have to be larger than necessary.

Therefore, there exists a need for an actuator retract circuit with a low internal energy consumption and a highly efficient distribution of the available energy to retract an actuator from its operational position over a disk into a fixed parking position. The current invention addresses this need.

OBJECTS AND ADVANTAGES

Accordingly, it is a primary object of the present invention to provide an energetically self-supportive electronic device to power an initial retraction and a final positioning onto a resistive parking ramp of a voice coil actuator.

It is a further object of the present invention to provide an energetically self-supportive electronic device with an internal energy consumption sufficiently low to keep the required capacitor size to a minimum.

It is a further object of the present invention to provide an energetically self-supportive electronic device for an efficient converting of capacitor energy into mechanical work done on the actuator.

The above objects and advantages, as well as numerous improvements attained by the apparatus and method of the invention are pointed out below.

SUMMARY OF THE INVENTION

The objects and advantages of the invention are achieved by a self-sufficient electronic device to retract and park a voice coil actuator on a resistive parking ramp. The device is preferably used in miniaturized hard disk drives, in which the kinetic energy of the rotating disk stack is not sufficient to be utilized as the energy source for the power-off retract and parking of the actuator. The invention therefore provides a simplified electronic circuit with low internal energy consumption that uses electric energy stored in one or more capacitors to perform the necessary tasks.

An initiation signal received by the device can be an operational signal from the computer or an internally generated signal resulting from a power loss in the computer. The initiation signal initiates a pulsed discharge of a stored energy from a capacitor through a voice coil (VCM) attached on the actuator.

The actuator has an operational velocity range defined by a maximum velocity toward and away from a resistive parking ramp, which is adjacent to the disk stack. After initiation of the pulsed discharge, the retraction velocity of the actuator depends on the operational velocity immediately prior to the application of the pulsed discharge. Further factors influencing the retraction velocity are mainly related to an actuator torque constant and a bias torque of flex cables connected to the actuator.

The retract velocity varies between a value sufficient to have the actuator reach the resistive parking ramp from the most distant position, and a maximum value that causes the actuator to bounce off a crash stop and jump back onto the disk surface. The crash stop is a physical barrier that prevents the actuator from moving past the end of the parking ramp.

The pulsed discharge is a sequentially interrupted energy flow from a capacitor charged during the regular operational use of the hard disk drive. The pulsed discharge can extend the discharge period of the capacitor to provide enough remaining energy at the moment the actuator reaches the resistive parking position. The remaining energy presses the actuator against the crash stop to avoid eventual rebound of the actuator. The pulsed discharge converts the stored electrical energy with higher efficiency than with a single capacitor discharge. This is achieved by reducing the period of each discharge pulse to a fraction of the theoretical rise time of the current in the VCM's self-inductance.

The maximum velocity of the actuator retraction results in a short retraction time and a short pulsed discharge. The remaining energy is sufficient at the moment, the actuator would bounce off the crash stop and compensates the high kinetic rebound energy of the actuator.

The minimum velocity of the actuator retraction results in a long retraction time and a long pulsed discharge. The remaining energy has a low value at the time the actuator reaches the resistive parking position without bouncing off the crash stop. The approximately proportional relation between the maximum velocity and the high remaining energy value on one hand and the minimal velocity and the low remaining energy value on the other hand results in an advantageous response characteristic of the retract device. Hence, the broad range of actuator conditions at the beginning of the emergency retraction is dealt with by a simplified electronic circuit.

The internal energy consumption of the electronic circuit is kept low by using few or no resistors and relying mostly on transistors functioning as switches to provide the pulsed discharge by the conduction and alternating interruption of the energy flow from the capacitor.

In addition, the VCM's self-inductance (SI) is utilized as an energy buffer during each alternating interruption interval (AII) of the energy flow. The energy in the buffer is consumed to maintain the torque imposed from the voice coil on the actuator, even during periods when no energy is drawn off the capacitor. The period to load the SI is voltage dependent. To utilize the buffer function of the shortened VCM to achieve an optimal current distribution over the retract event, the invention also reduces the AII dependent on the decaying voltage of the drained capacitor energy. As a result, the average current flow remains high to compensate a declining voltage on the discharging capacitor and to provide sufficient energy to push the actuator onto the ramp under all varying initial retract conditions. The energy drain from the capacitor remains also above a minimum level, necessary to maintain the minimum velocity of the actuator.

The electronic device of the invention embodies a simple logical concept and has small demand for information gathering and processing. These features make the device space and energy efficient, and hence suitable for use in miniaturized hard disk drives.

DETAILED DESCRIPTION

Although the following detailed description contains many specifics for the purposes of illustration, anyone of ordinary skill in the art will appreciate that many variations and alterations to the following details are within the scope of the invention. Accordingly, the following preferred embodiment of the invention is set forth without any loss of generality to, and without imposing limitations upon, the claimed invention.

Figure 1:
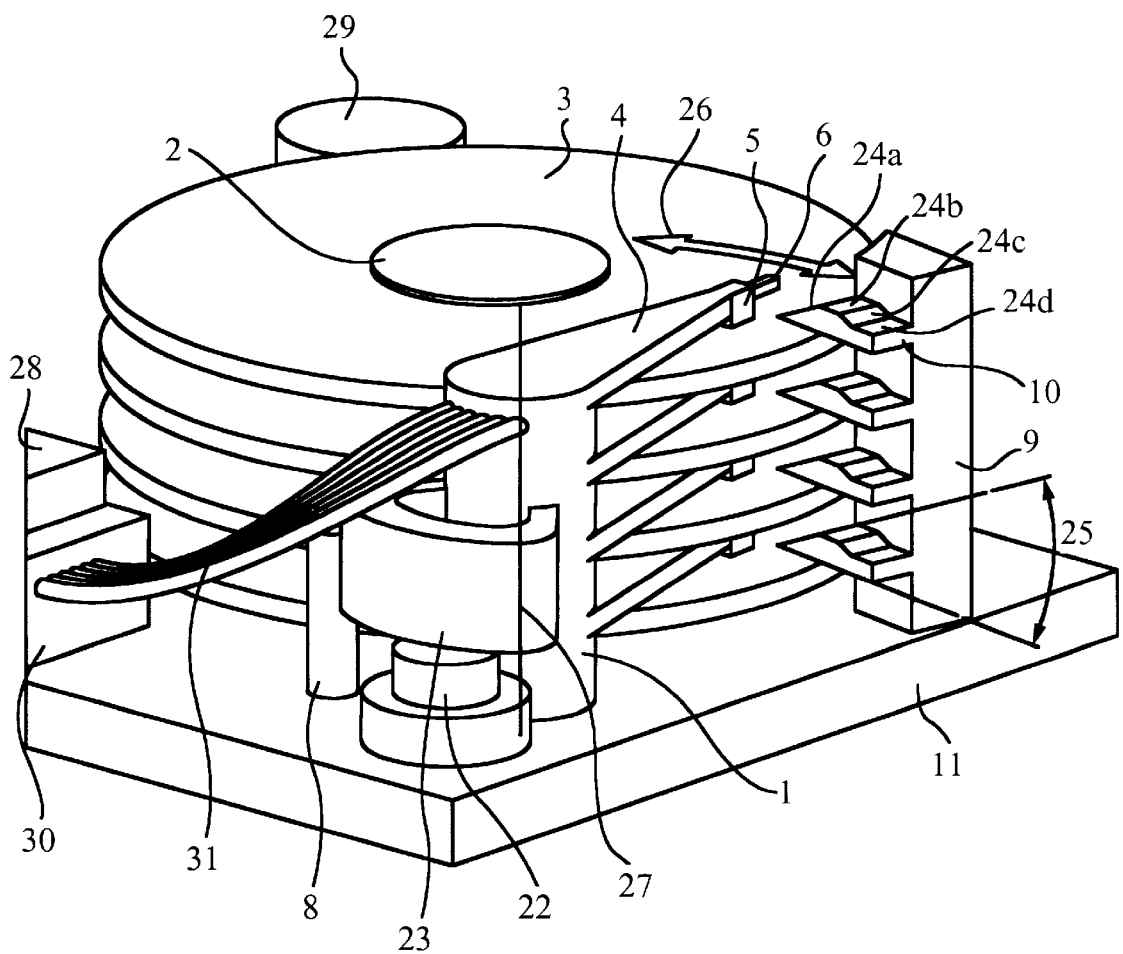
FIG. 1 shows a fragmental perspective view of a simplified hard disk drive.

FIG. 1 shows a fragmental perspective view of a simplified hard disk drive with an array of parking ramps 10 on a ramp block 9 as an example of a parking ramp structure. A chassis base 11 carries an actuator 1 with a number of actuator arms 4, each of them carrying one or two read and write heads 5 and a friction contact 6. Each read and write head 5 is held in close flying height to one disk surface 3 of the disk stack 2. A voice coil motor shown in FIG. 1 works according to the principle of a moving coil-motor. The voice coil 23 as the moving part is thus attached to the actuator 1. A magnet assembly 22 is mounted on the chassis base 11. A current applied by a controller through voice coil 23 in the magnetic field of magnet assembly 22 results in a force on the voice coil 23 and a torque on the actuator 1. The voice coil 23 has inductance; as a result, whenever a current is applied to voice coil 23, a certain energy is stored in the form of an additional magnetic field eminating from the voice coil 23. When the voice coil 23 moves through the magnetic field from magnet 22, across voice coil 23 a back electromotive voltage develops, which is proportional to the angular velocity of actuator 1. This stored energy is utilized in the present invention by simultaneously disconnecting the OV and shorting the voice coil 23. The stored energy is then consumed while creating a mechanical torque on the actuator 1. The efficiency of this process depends on an end-voltage, at which the voice coil 23 is opened again. The efficiency is at the highest level, when the voice coil 23 remains shorted exactly to the moment when the end-current reaches zero. If the voice coil 23 remains shorted beyond that moment, the Vbemf of the moving actuator brakes the previously accelerated actuator 1 by generating a current in the opposite direction. During regular operation the disk stack 2 spins at a predetermined rotational speed. The read and write head 5 has an air bearing surface which flies on the air film and keeps the read and write head 5 at a constant height above the disk surface 3.

During regular operational shut down of a computer, the voice coil 23 moves the actuator 1 with the attached friction tabs 6 to a parking ramp 10, which consists, in the example shown in FIG. 1, of the following: an inclining portion 24a, a flat section 24b, a downhill section 24c and a flat parking area 24d. The parking ramp 10 extends onto the disk surface 3 such that each retracting read and write head 5 is lifted out of it's movement plane 26. During the operational retraction each friction tabs 6 glides along the flat section 24b and the downhill section 24c into the flat parking area. It is appreciated that anybody skilled in the art may vary the appearance of the parking ramp 10 without diverting from the core of the invention.

A crash stop pin 8 is positioned within the movement range of the voice coil 23 on the chassis base 11 to prevent further movement of the actuator 1 which would force the lift tabs 6 beyond the flat parking area 24d. To avoid a situation where the actuator 1 is pushed out of the parking position from a peripheral induced shock impulse such that it might land on the disk surface, it has to be secured onto the flat parking area 24d. Two types of latches are typically used for this purpose:

1) a passive mechanical latch, in which the actuator arm 4 has to be pushed with a significant amount of torque to engage with a snapping mechanism belonging to this latch.
2) an inertia latch, which is initiated only by an externally induced shock, whereby the actuator arm 4 or the side of the actuator 1 at the voice coil 23 is grabbed and secured in the parking position. The inertia latch is energetically independent from the retract event, which makes it preferable in combination with low energy consuming emergency retract devices. The inertia latch has a certain grabbing range within which the actuator arm 4 has to be parked.

In an emergency situation, e.g., when the functioning of the computer is interrupted, or when the power supply level changes beyond acceptable limits, an emergency retract command is issued by the computer or by an pulsed discharge circuit 28, which recognizes the power level change of the power supply. In a pulsed discharge, a capacitor 29, which is charged during regular operation of the hard disk, discharges its energy through the voice coil 23 to generate a torque therein and force the actuator 1 towards the parking position.

The capacitance of capacitor 29 is chosen to provide a predetermined energy to overcome a number of varying opposing forces and effects. These are mainly due to the slope and height of the load/unload ramps, which the heads must climb in the parking process, a flex bias of supply cables 31 running from the hard disk controller 30 onto the moving actuator 1, mechanical friction resistance in the pivot bearing of the actuator 1, varying positions of the actuator 1 and varying velocities of the actuator 1 at the beginning of the emergency retraction. Further opposing effects are: electrical resistance in the voice coil 23, friction of the friction tabs 6 on the parking ramp 10, a pull-down force on the read and write heads from the air bearing surface during lift off on the parking ramp 10, drive-to-drive component differences and time dependent component characteristics.

The size of the capacitor 29 has to be kept at a level that is low enough to fit the capacitor 29 into miniaturized hard disks.

Figure 2:
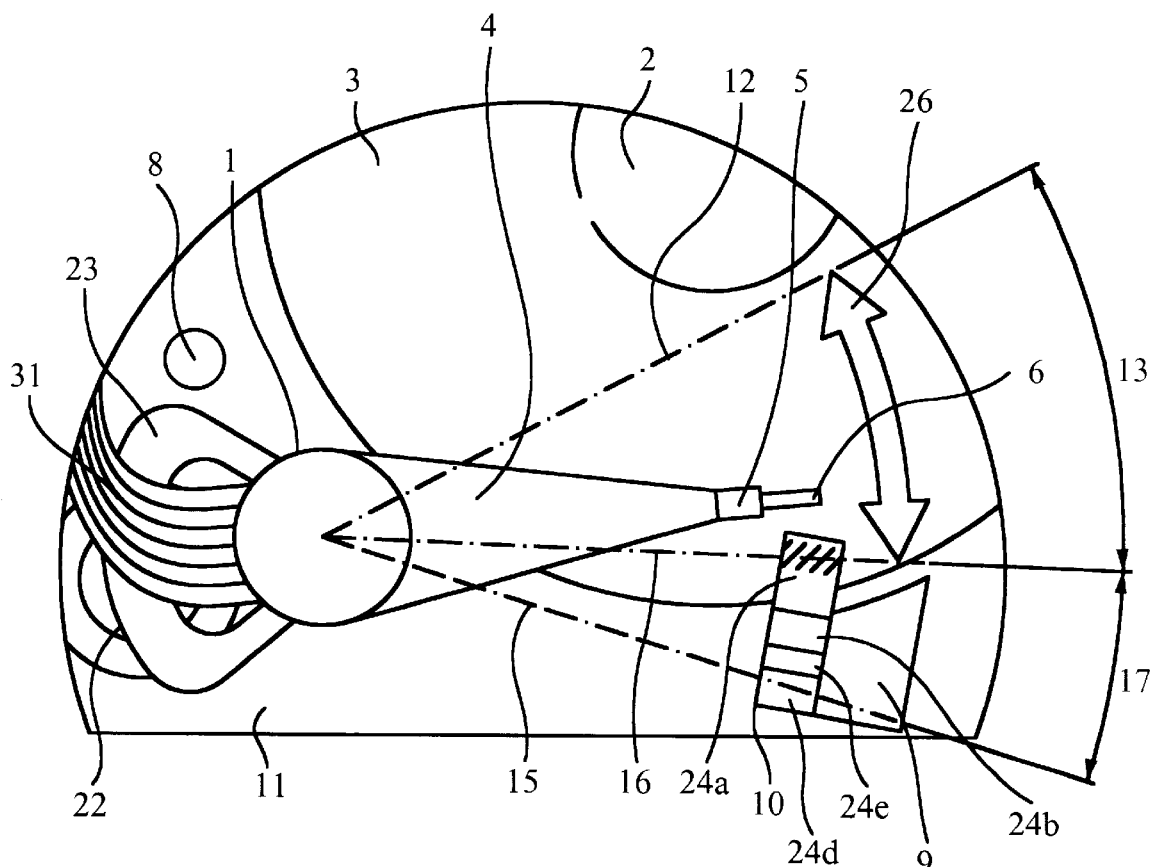
FIG. 2 shows a fragmental schematic view of a simplified hard disk drive.

FIG. 2 shows a schematic fractional top view of an exemplary parking ramp structure consisting of the same exemplary components as shown in FIG. 1. Further shown is an inner and outer actuator range limit 12, 16 defining an operation angle 13 within which the actuator 1 swings at various velocities. A parking position 15 and a ramp contact position 16 define a mechanical ramp friction range 17.

Since a power failure of the disk drive has to be anticipated at any time, actuator 1 is considered moving within the operation range 13 at an unknown velocity and at an unknown location at the retraction initiation. Retract current is imposed onto the voice coil 23 to exert a torque on actuator 1 in order to move it to the parking position 15. A minimum and maximum limit of the retract current level are defined in regard to the unknown initial state of actuator 1. The minimum current limit is dictated by a worst-case of the opposing effects and the highest required torque to move actuator 1 from a resting position at the bottom of the inclining portion 24a into the parking position 15. The maximum current limit is dictated by the lowest torque required to move actuator 1 to parking position 15. This case commonly occurs when the actuator 1 is at the retract initiation far away from the parking position 15 close or at the inner actuator range limit 12. When a torque is applied to the actuator 1, it has time to accelerate and build up angular momentum to a high velocity before striking parking ramp 10 and crash stop pin 8. In a situation, when the velocity of the actuator 1 exceeds a maximum limit, it strikes the crash stop 8 with excessive velocity, and actuator 1 bounces back onto the inclining portion 24a, or the read and write heads 5 land back on the disk surface 3.

Figure 3:
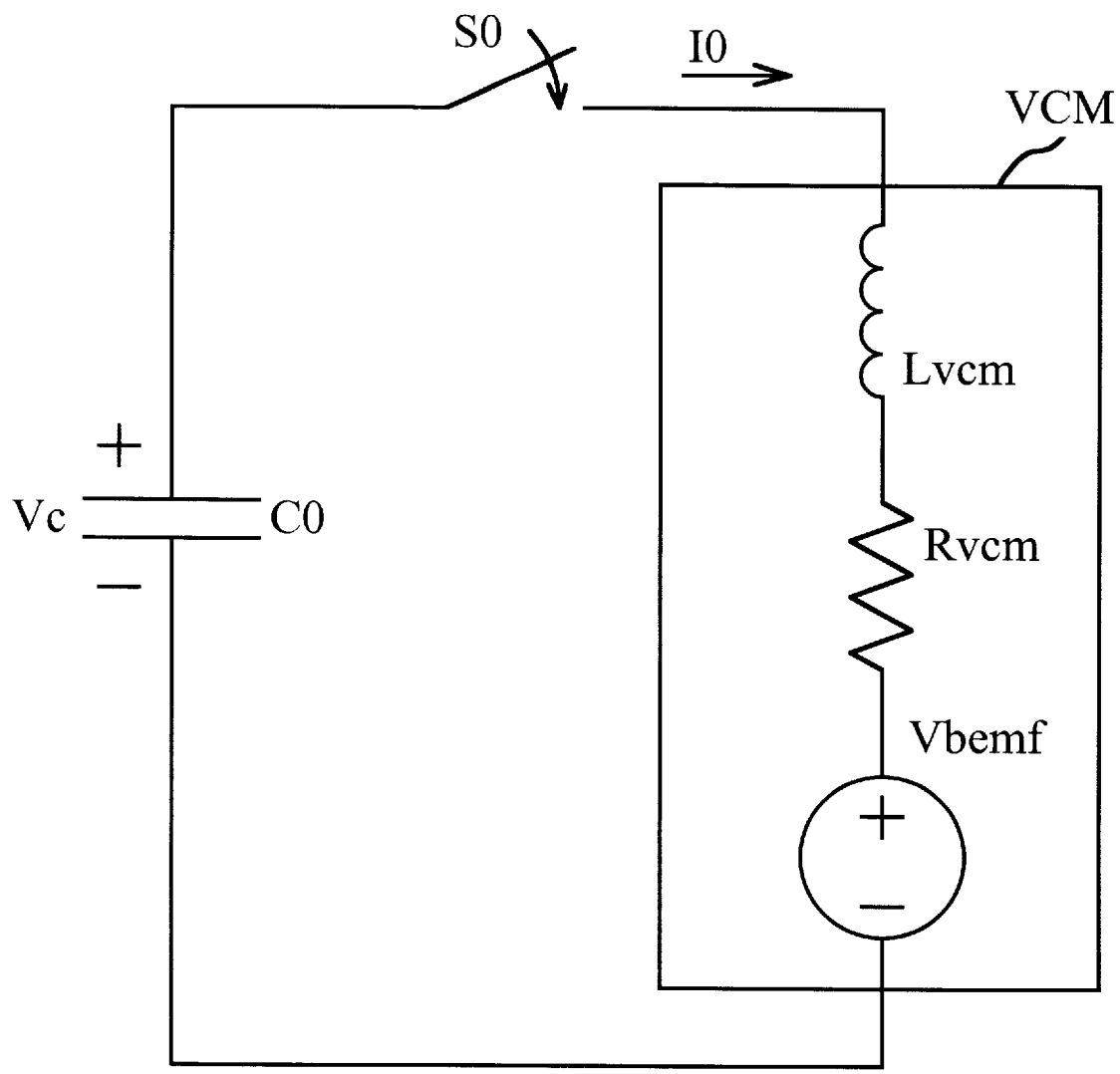
FIG. 3 shows a simplified retract circuit with one alternating connecting and disconnecting switch.

FIG. 3 shows a circuit that accomplishes a direct discharge of an energy storage capacitor through a voice coil motor VCM as it is the state of art. Switch S0 closes in response to a retract initiation, and a current I0 flows continuously while capacitor C0 discharges. The electrical equivalent of the voice coil motor VCM is an inductor Lvcm in series with a resistance Rvcm and a back electromotive voltage Vbemf.

Figure 4:
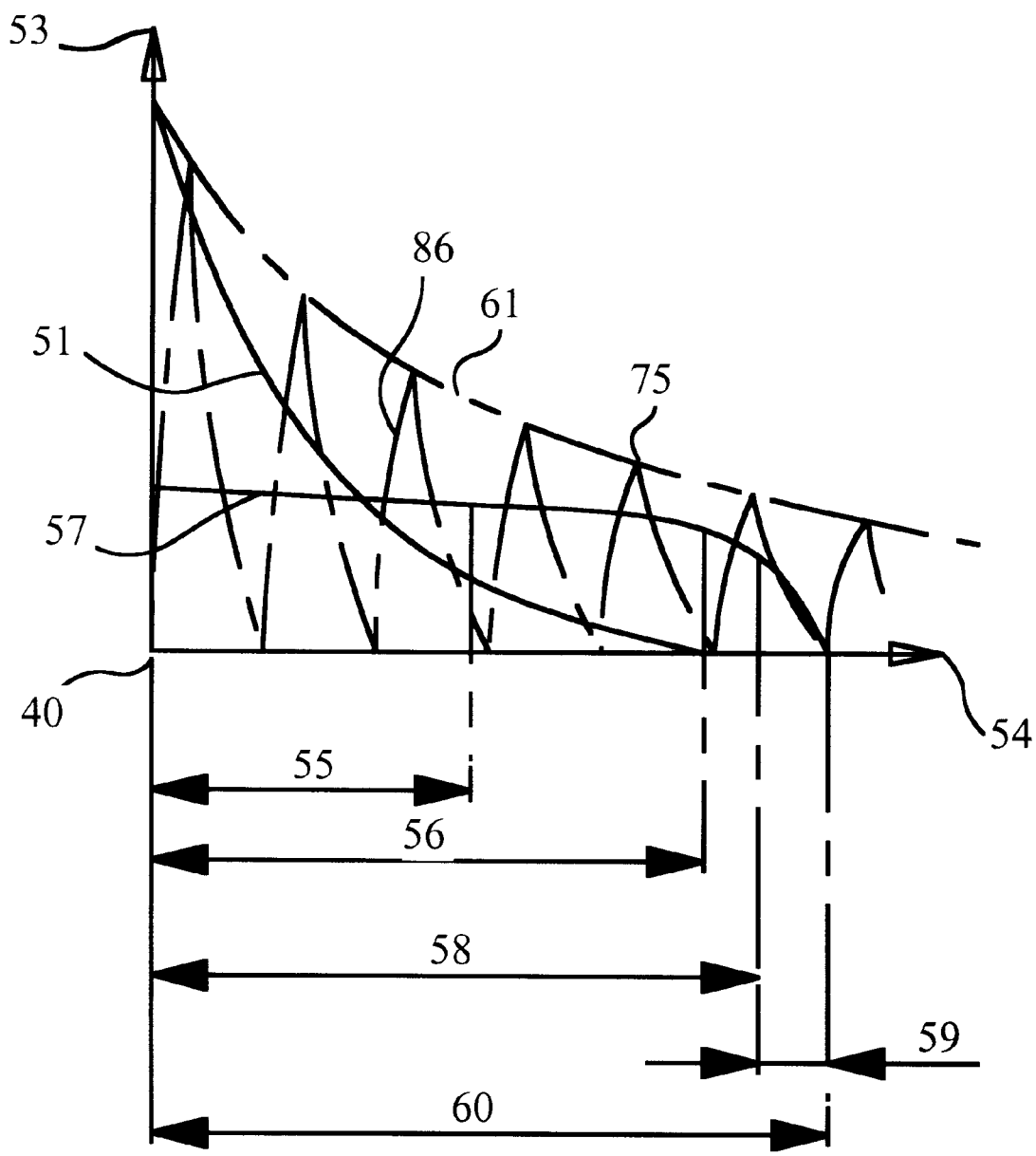
FIG. 4 shows a simplified diagram of the average current flow of the retract circuit of FIG. 3 compared with an uninterrupted capacitor discharge.

FIG. 4 shows a simplified diagram of the average current flow 57 of the pulsed discharge circuit 28 compared with a direct and continuous capacitor discharge as described in FIG. 3. A vertical axis 53 represents the current level and a horizontal axis 54 represents the time duration. Curve 51 is an exemplary waveform for I0 in FIG. 3. Depending on the position of actuator 1 within operating range 13 and kinetic status of actuator 1 at the retract begin 40, the actuator 1 reaches the resistive parking position 15 in a time range between a minimum retract period 55 and a maximum retract period 58. In the case where the actuator 1 reaches the ramp during minimum retract period 55, there is still torque exerted on the actuator by retract current 51, since current 51 does not diminish to zero until the end of time 56. If the actuator 1 reaches the ramp after period 56, during maximum retract period 58, current 51 has decayed and thus no torque is exerted on the actuator 1. In a situation when the velocity of the actuator 1 exceeds a maximum limit, it strikes the crash stop 8 with excessive velocity and actuator 1 bounces back onto the inclining portion 24a, or the read and write heads 5 land back on the disk surface 3.

The pulsed discharge circuit 28 provides a pulsed discharge of capacitor 29 and takes advantage of temporary energy storage in the inductance of the VCM. As a result, the average current flow 57 is lower than the peak current of a theoretical, proportional expanded discharge current (EDC), which is shown in FIG. 4 with the curve segments 61. The EDC is defined by the theoretical peak values 75 of an instantaneous current 86, which correspond to a supply interval 63a, 63b, (see FIGS. 6, 7) and a supply interruption interval 64a, 64b (see FIGS. 6, 7) of the pulsed discharge circuit 28. The curve segments 61 are shown in FIG. 4 for the sole purpose of visualization. Since the inductance of the voice coil 23 charges asymptotically, the theoretical peak values 75 are never reached in praxis such that they are used only as a theoretical reference. The average current flow 57 typically extends beyond minimum and maximum retract periods 55, 58 to an extended duration 60.

The pulsed discharge integrates overall more current flow during the retraction than it is achievable with a direct capacitor discharge, since it reuses the energy stored in the inductance of the voice coil 23.

Even after the maximum retract period 58 a compensation period 59 is available, during which sufficient average current is flowing through the voice coil 23 to built up compensatory torque against an eventual rebound of the actuator 1 from the crash stop 8.

Figure 5:
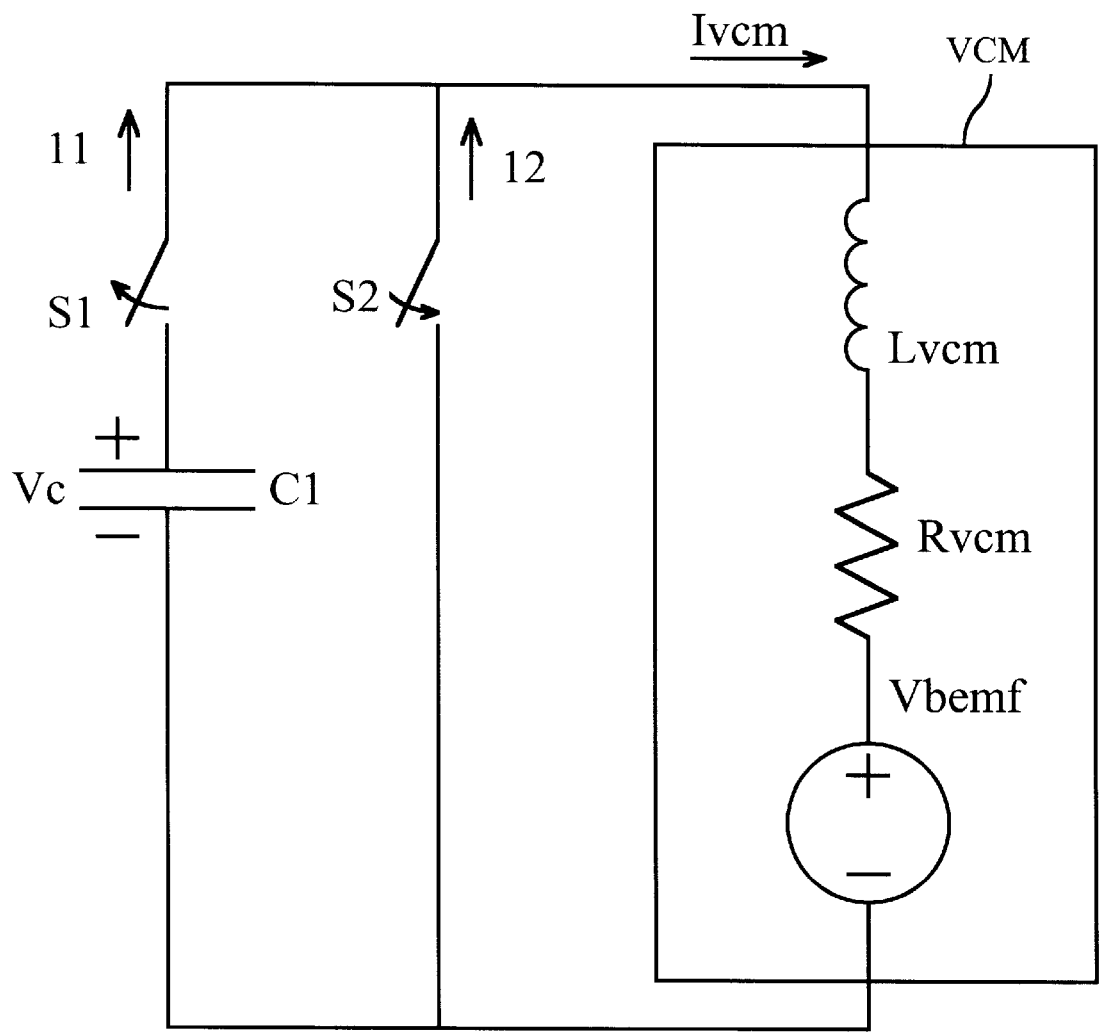
FIG. 5 shows a simplified retract circuit with two alternating connecting and disconnecting switches.

FIG. 5 shows a simplified schematic of the pulsed discharge circuit 28 to illustrate the switching necessary for the pulsed discharge of capacitor 29. Capacitor C1 is charged during regular operational use of the hard disk to an initial voltage Vc, while the switches S1 and S2 are open. At the initiation of the retract event, switch S1 is first closed for the supply interval, while switch S2 remains open. After this, the first switch S1 is opened, and switch S2 is closed simultaneously for the supply interruption interval. The alternating opening and closing of switches S1 and S2 continues until the energy to power the retract event is exhausted.

Figure 6:
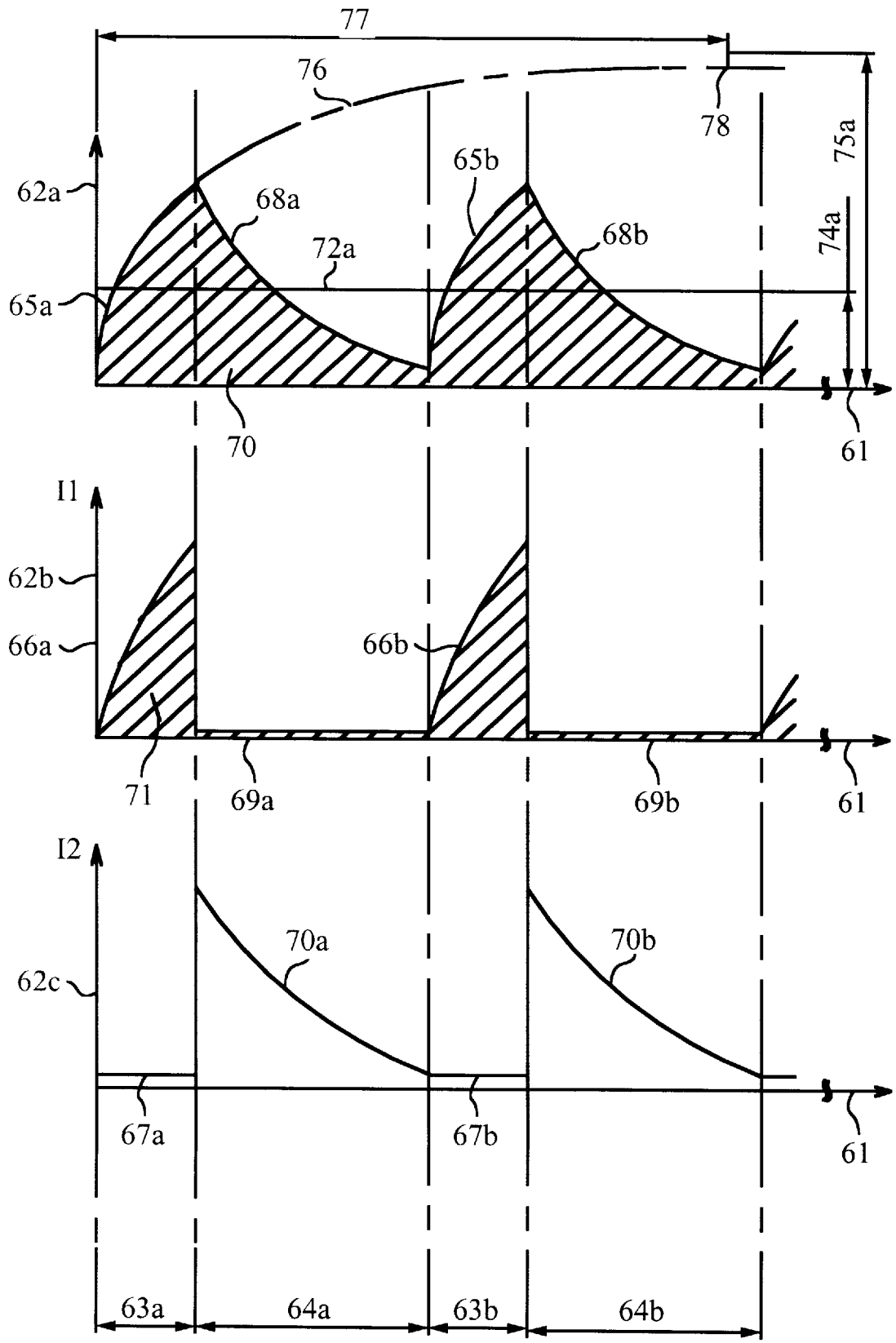
FIG. 6 shows a simplified diagram of the current flow at various positions of the retract circuit of FIG. 5 with a relatively long duty cycle.

FIG. 6 shows exemplary current waveforms for the circuitry shown in FIG. 5. The horizontal axes 61 represent the elapsed time. The vertical axis 62a shows the current Ivcm through the VCM. The vertical axis 62b shows the current flowing through S1. The supply intervals 63a, 63b represent the on-time of switch S1 and supply interruption intervals 64a, 64b represent the off-time of switch S1. The waveforms in FIG. 6 represent a low duty cycle of the supply intervals 63a, 63b relative to a total cycle period, which is the sum of one of the supply intervals 63a, 63b and one of the consecutive supply interruption intervals 64a, 64b. In FIG. 6 the duty cycle is shown as being approximately 33%. During the supply intervals 63a, 63b current is flowing from the capacitor C1 through the voice coil VCM. The current flow curves 65a, 65b rise asymptotically and in accordance to the time constant of the voice coil motor VCM, which is given by the ratio of the inductance Lvcm to the resistance Rvcm. The supply intervals 63a, 63b are approximately one fifth of a period 77 for a 99% saturation level 78 of the theoretical exponential curve 76 with the theoretical current peak level 75a. During Interval 63a, 63b second switch current I2 has a zero level 67a, 67b. At the end of interval 63a, 63b switch S1 opens and switch S2 closes, whereby the voice coil VCM is shorted. As a result, the voice coil current Ivcm is maintained by the energy stored in the inductance Lvcm and flows in a decaying curve 70a, 70b through second switch S2. During supply interruption interval 64a, 64b the capacitor current I1 is zero. The length of the supply interruption interval 64a, 64b is optimal for high energy efficiency, when the supply interruption intervals 64a, 64b last to the moment, where the current Ivcm reaches zero, which is shown by the voice coil decaying curve 68a, 68b.

Shorting the voice coil VCM during supply interruption intervals 64a, 64b utilizes the inductance Lvcm as an energy buffer. As a result, the magnetic energy stored in the inductance of the voice coil VCM at the beginning of each supply interval 63a, 63b is utilized. Therefore, in the circuit shown in FIG. 5 more energy is converted into torque than can be converted in the circuit shown in FIG. 3.

A first average current level 72a is the integrated average of the current flow curves 65a, 65b and the voice coil decaying curve 68a, 68b. Due to the low duty cycle with the voice coil decaying curve 68a, 68b going down to nearly zero, the average level height 74a is relatively low compared to the theoretical peak level 75a. This first discharge characteristic is desirable at the beginning of the retraction where the high initial voltage in the capacitor 29 results in a high theoretical peak current 75a. As a result, the average current flow 72a is tuned to a minimal level, which is necessary to exert sufficient torque under worst conditions.

Figure 7:
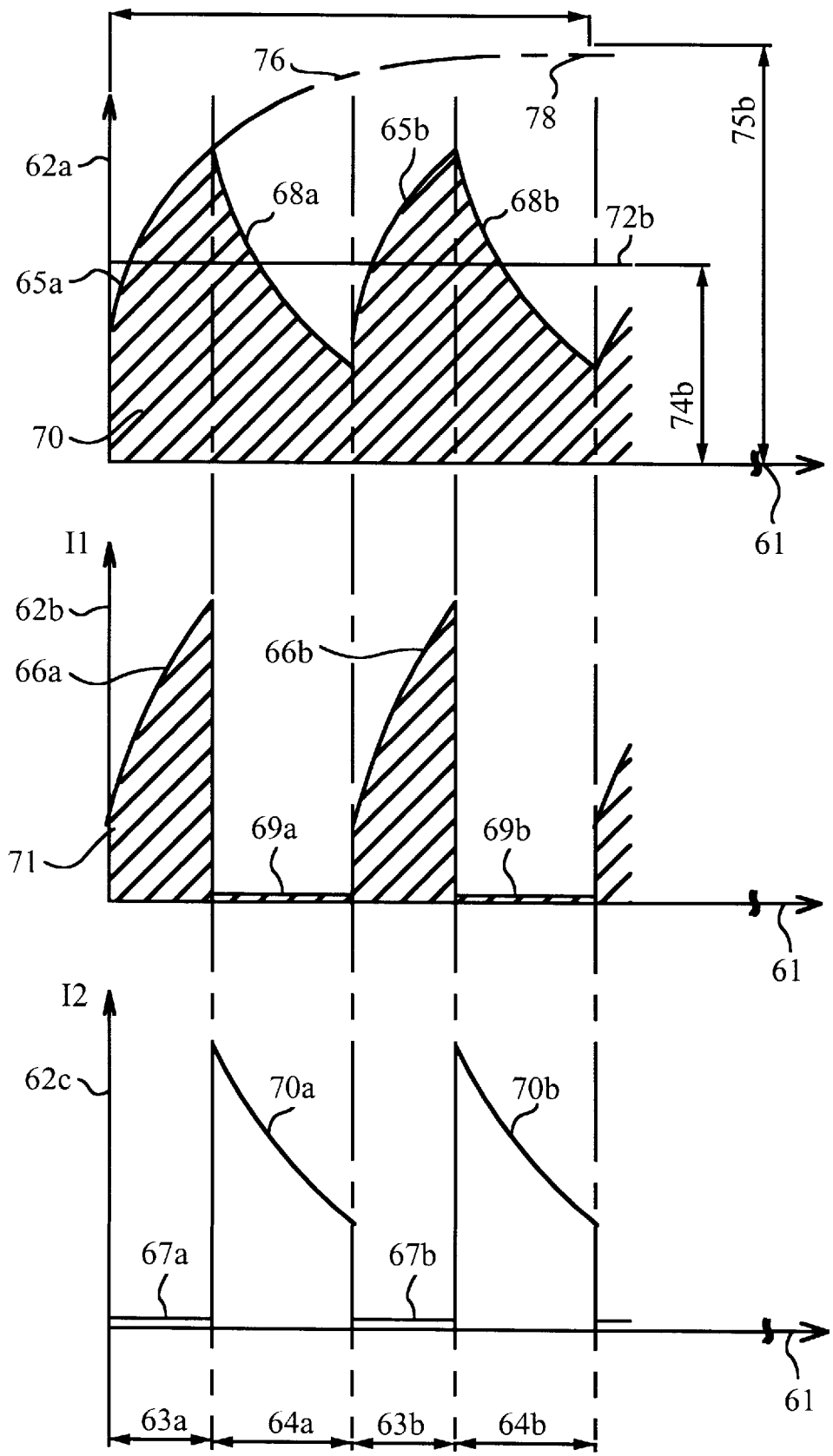
FIG. 7 shows a simplified diagram of the current flow at various positions of the retract circuit of FIG. 5 with a relatively short duty cycle.

FIG. 7 shows an example of the current waveforms of the circuit shown in FIG. 5 with a high duty cycle of approximately 50%. The supply interruption intervals 64a, 64b have a significantly shorter duration than those of FIG. 6 with the following two main effects:

1) the constant voice coil decaying curve 68a, 68b does not decay to nearly zero anymore.
2) only a fraction of the energy pumped into the inductance Lvcm is consumed during supply interruption intervals 64a, 64b and during the supply intervals 63a, 63b, the current reaches after several cycles a level closer to the theoretical peak level 75b. As a result of both, the average voice coil current 72b is at a higher level relative to the theoretical current peak level 75b than it is the case in FIG. 6. The decrease in theoretical current peak level 75a, 75b during the retract event is in proportion to the gradually decreasing voltage during discharge of the capacitor C1. The average torque on the actuator is proportional to the average current in the coil. As the capacitor discharges, the current would fall unless the duty cycle is increased to compensate. By increasing the duty cycle as the capacitor discharges, an approximately constant torque can be applied to the actuator until the capacitor discharges beyond a certain point.

This second discharge characteristic is desirable for the late period of the retraction, where the capacitor energy has been mostly consumed and the voltage has dropped. The preferred embodiment of the invention combines first and second discharge characteristic to adjust the duration of the supply interruption interval 64a, 64b. Additional circuitry as it is well known to those skilled in the art is used thereby to monitor the capacitor voltage and to take its level as parameter to modulate the first and second duration Dl and Dh of a clock signal Vclock (see FIG. 9), which initiates synchronously the switches S1 and S2.

In an alternate embodiment of the invention the additional circuitry is left out to reduce the complexity of the pulsed discharge circuit 28. The duty cycle is set at a fixed level to balance the energy efficiency of the retract event with the average current necessary to move actuator 1 safely to parking position 15.

Figure 8:
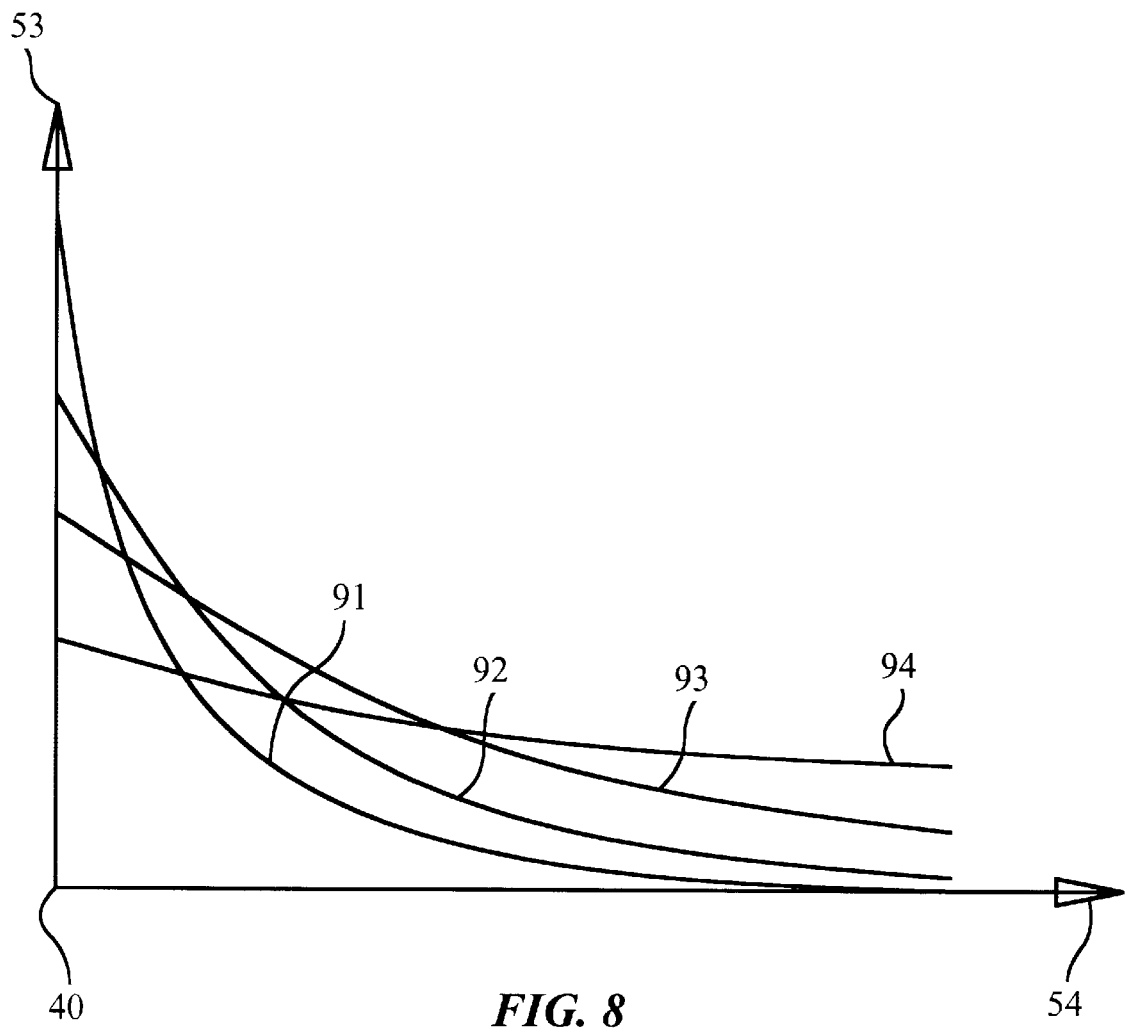
FIG. 8 shows a simplified diagram of the average current flow of the retract circuit of FIG. 5 with various duty cycle lengths.

FIG. 8 shows a simplified graphic of a number of current levels for various duty cycles to visualize the relation between duty cycle and average current through the voice coil motor VCM. All elements shown in the graphic are for the sole purpose of visualization without any accuracy.

The vertical axis 53 represents the magnitude of the average current, the horizontal axis represents a retract duration 54 and the origin 40 is the zero point of both. A first curve 91 shows a duty cycle of 100%, which equals a direct single pulse discharge. A second curve 92 shows a duty cycle of approximately 80%. A third curve 93 shows a duty cycle of approximately 60%. A fourth curve 94 shows a duty cycle of approximately 40%. First, second, third and fourth curve 91, 92, 93 and 94 show that even a fixed duty cycle significantly reduces the differences of the retract current at the beginning and the end of the retraction. As further results, the retract current duration is typically extended in case the retract current level is lower and the total integrated current increases with decreasing duty cycle.

Figure 9:
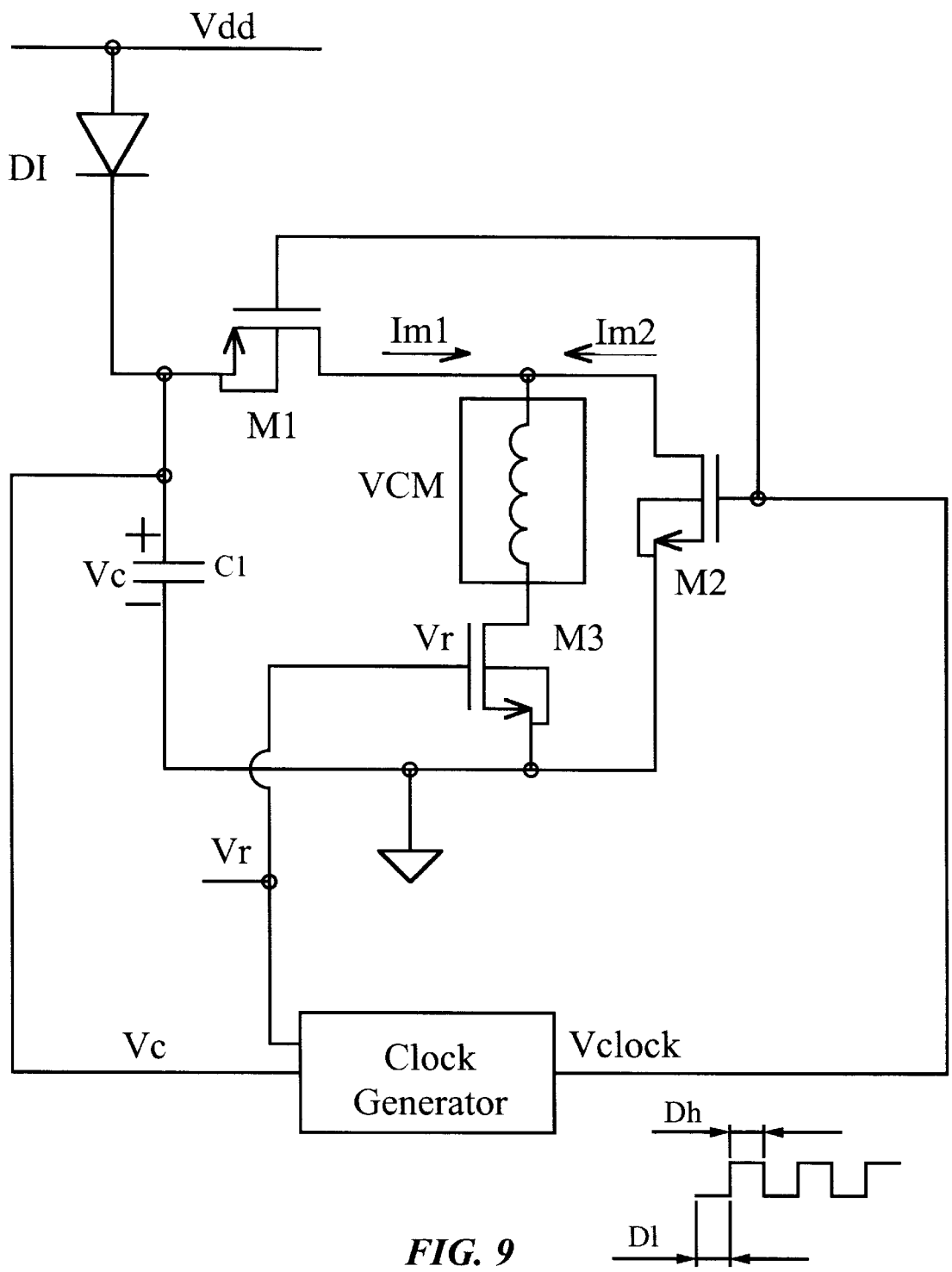
FIG. 9 shows a simplified electric circuit of the preferred embodiment of the invention.

FIG. 9 shows a simplified electric circuit of the preferred embodiment of the invention. The exemplary logical concept of the shown circuit together with the graphical representation of metal-oxide-semiconductor transistors (MOS) is for the sole purpose to describe the working principle of the invention. A person with average skill in the art will appreciate that the switching can also be accomplished with bipolar transistors, insulated gate bipolar transistors, diodes, relays, or other current switching elements. A person with average skill in the art will appreciate that the switching effect described for this figure is also achievable with other known switching configurations without diverting from the scope of the invention. Additional circuit elements necessary to compensate specific characteristics of the involved components are not shown. These additional elements are well known to a person of average skill in the art, as are the electronics techniques for further optimizing the circuitry.

A capacitor C1 is charged during regular operation of the hard disk from a power source Vdd and has an operational voltage Vc. A diode D1 blocks an eventual discharge of C1 into Vdd during operation of the circuit. When Vdd drops below a predetermined value, or when an emergency retract command is issued by the computer, a signal Vr goes to a high value. As a result, transistor M3 is closed and clock generator Cg is initiated, both for the duration of the retract event. In the preferred embodiment Cg receives Vc as parameter to provide a frequency signal Vclock in the form of an alternating control voltage. Vclock is repeatedly transmitted with a low value for the first duration Dl and a high value for the second duration Dh. In the preferred embodiment, the lengths of the second duration Dh is altered in dependence to Vc to dynamically adjust the average current level 72a, 72b. In an alternate embodiment the gathered voltage information is utilized to alter second duration Dh and/or first duration Dl. In a further alternative embodiment the lengths of first and second duration Dl, Dh are fixed.

During Dl, M1 is in a conducting or low-resistance state, while M2 is in non-conducting, or high-resistance state. As a result, a first current Im1 flows from C1 through M1, the VCM and M3. During Dh, M1 in a non-conducting state, while M2 is in a conducting state. A current Im2 flows through M2, the VCM and M3.

Accordingly, the scope of the invention should be determined by the following claims and their legal equivalents:

What is claimed is:

1. An electronic device for a capacitor discharge over an extended time period through a voice coil of an actuator for a retraction and a final positioning of said actuator into a predetermined parking position, said device comprising:
    a) an initiation means to initiate said retraction;
    b) at least one capacitor for providing said energy flow; and
    c) a pulsed discharge circuit connected to said at least one capacitor and said voice coil, said pulsed discharge circuit comprising:
        1) a first switching means for periodically connecting said at least one capacitor with said voice coil;
        2) a second switching means for shorting a driving coil circuit of said voice coil while said at least one capacitor is disconnected from said voice coil;
        3) a control means to provide alternating closing of said first switching means and said second switching means.

2. The electronic device of claim 1, wherein said predetermined parking position is on a resistive parking ramp.

3. The electronic device of claim 1, wherein said final positioning is an urging of said actuator against a crash stop feature.

4. The electronic device of claim 1, wherein said initiation means is initiated by a predetermined condition of a power supply of a hard disk drive.

5. The electronic device of claim 1, wherein said first switching means and said second switching means are transistors.

6. The electronic device of claim 1, wherein said control means provides a frequency signal, wherein said frequency signal initiates a pulse interval.

7. The electronic device of claim 1, wherein said predetermined parking position is a landing zone in a central portion of a recording disk.

8. An electronic device for a capacitive discharge over an extended time period through a voice coil of an actuator for a retraction and a final positioning of said actuator into a predetermined parking position, said electronic device comprising:
    a) an initiation means to initiate said retraction;
    b) at least one capacitor for providing an energy flow; and
    c) a pulsed discharge circuit connected to said at least one capacitor and said voice coil, said pulsed discharge circuit comprising:
        1) a first switching means for periodically connecting said at least one capacitor with said voice coil;
        2) a second switching means for shorting a driving coil circuit of said voice coil while said at least one capacitor is disconnected from said voice coil;
        3) a control means to provide alternating closing of said first switching means and said second switching means; and
        4) a transforming means connected to said control means for transforming a voltage information from said at least one capacitor to a frequency signal for said control means.

9. The electronic device of claim 8, wherein said predetermined parking position is on a resistive parking ramp.

10. The electronic device of claim 8, wherein said final positioning is an urging of said actuator against a crash stop feature.

11. The electronic device of claim 8, wherein said initiation means is initiated by a predetermined condition of a power supply of a hard disk drive.

12. The electronic device of claim 8, wherein said first switching means and said second switching means are transistors.

13. The electronic device of claim 8, wherein said control means provides a frequency signal, wherein said frequency signal initiates a pulse interval.

14. The electronic device of claim 13, wherein said pulse interval has a supply interval and a supply interruption interval.

15. The electronic device of claim 14, wherein said supply interruption interval is adjusted dependent on said voltage information.

16. The electronic device of claim 14, wherein said supply interval is adjusted dependent on said voltage information.

17. The electronic device of claim 14, wherein said periodical connection is a continuation of said supply interval.

18. The electronic device of claim 14, wherein said shorting of said driving coil circuit is a continuation of said supply interruption interval.

19. The electronic device of claim 8, wherein said predetermined parking position is a landing zone in a central portion of a recording disk.

* * * * *